(12) United States Patent
Schneider et al.

(10) Patent No.: US 11,961,688 B2
(45) Date of Patent: Apr. 16, 2024

(54) KEYCAP PARTICLE EVACUATION STRUCTURE

(71) Applicant: Apple Inc., Cupertino, CA (US)

(72) Inventors: Samuel O. Schneider, Sacramento, CA (US); Kyle J. Nekimken, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/820,382

(22) Filed: Aug. 17, 2022

(65) Prior Publication Data
US 2024/0062971 A1    Feb. 22, 2024

(51) Int. Cl.
*H01H 13/14* (2006.01)
*G06F 1/16* (2006.01)
*H01H 13/20* (2006.01)
*H01H 13/70* (2006.01)

(52) U.S. Cl.
CPC .......... *H01H 13/70* (2013.01); *G06F 1/1662* (2013.01); *H01H 13/14* (2013.01); *H01H 13/20* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | |
|---|---|---|---|
| 11,443,906 B1 * | 9/2022 | Oakeson | H01H 13/80 |
| 2017/0178835 A1 * | 6/2017 | Freyermuth | H01H 13/06 |

* cited by examiner

*Primary Examiner* — Ahmed M Saeed
(74) *Attorney, Agent, or Firm* — Dorsey & Whitney LLP

(57) ABSTRACT

A keycap includes a keycap body with a top surface and a top periphery region extending around the top surface. A recessed area extends across the top surface inward of the top periphery region, with the top periphery region being elevated relative to the recessed area. The keycap also includes a set of grooves extending from the recessed area and across at least a portion of the top periphery region.

20 Claims, 9 Drawing Sheets

KEYCAP PARTICLE EVACUATION STRUCTURE

FIELD

The described embodiments relate generally to keyboards and key mechanisms for electronic devices. More particularly, the present embodiments relate to keycap particle evacuation structures for use with keyboards and key mechanisms for electronic devices.

BACKGROUND

A keyboard allows users to provide user input to a computing device by depressing or touching one or more keys on the keyboard. As such, a keyboard is one of the most frequently touched parts of a computer. Over time, keyboards collect large amounts of oil, dirt, grime, and other contaminants, especially from a user's hands.

Recent advances in portable computing have also led to thinner, more compact devices (e.g., laptops and removable keyboards) that are often stored in travel luggage, briefcases, backpacks, duffle bags, or purses. The portability (and associated transportation/storage) of such devices increases the likelihood of contact between the keys of the keyboard and the display while the notebook computer is closed and the display screen is positioned adjacent to the top surfaces of the keycaps. When stowed in a backpack, for instance, portable computing devices are often compressed and jostled amongst other solid objects in the backpack or pressed tightly against the internal structure of the backpack.

With increased contact between displays and keyboards, contaminants and debris on the keycaps can cause damage to the display. For example, oil on the keycaps can transfer to the display when the display is closed over the keyboard—thereby leaving unsightly oil smudges at the points of contact with the display. Dust particles and dirt on the keycaps can scratch the face of an abutting display. These marks can permanently affect the appearance and usability of the device. Therefore, there is a constant need for improvements to the usability, manufacture, and effectiveness of keyboards that interface with (e.g., abut) a display when closed in a folded or clamshell configuration.

SUMMARY

An aspect of the present disclosure relates to a keycap. In some embodiments, the keycap can include a keycap body with a top surface and a top periphery region extending around the top surface. The keycap also includes a recessed area extending across the top surface inward of the top periphery region, with the top periphery region being elevated relative to the recessed area. The keycap also includes a set of grooves extending from the recessed area and across at least a portion of the top periphery region.

In some embodiments, the top periphery region comprises a plateau surface. The plateau surface can also be comprised of a first edge and a second edge opposite the first edge, with the plateau surface being planar between the first edge and the second edge. In some embodiments, the plateau surface can comprise a polished surface devoid of pockets greater than 0.5 micron in width or depth. The set of grooves can also extend across the entire plateau surface, and can be sized greater than a threshold percentile of dust particles. In some embodiments, the keycap body further comprises a side surface adjoined to the top periphery region at a keycap edge. In certain implementations, at least one groove of the set of grooves is oriented perpendicular relative to the keycap edge. In particular embodiments, the keycap body further comprises a central portion of the top surface positioned within the recessed area, and at least one groove of the set of grooves is oriented radially relative to the central portion. In some embodiments, the set of grooves includes a first groove with a first orientation and a second groove with a second orientation that differs from the first orientation.

Another aspect of the present disclosure relates to a keyboard assembly. The keyboard assembly includes a keyboard housing with a set of key mechanisms disposed within the keyboard housing. Each key mechanism of the set of key mechanisms comprises a keycap body, including a sidewall, a plateau surface substantially perpendicular to the sidewall with an inner edge and an outer edge, a transition portion adjoining the sidewall and the outer edge, a recessed area extending across a top surface of the keycap body inward of the inner edge of the plateau surface, and a set of particle exit paths extending from the recessed area, across the inner edge and the outer edge below the plateau surface, and to the transition portion.

In certain implementations, the keyboard assembly includes a plateau surface comprised of a polished and planar surface configured to contact a computing device display. The set of particle exit paths can also be interspaced along the plateau surface, the set of particle exit paths being spatially configured to receive particles from the plateau surface. In some embodiments, each particle exit path of the set of particle exit paths comprises an evacuation end positioned at the transition portion, and a particle received by at least one particle exit path of the set of particle exit paths is configured to exit the evacuation end in response to movement of the keycap body. The set of particle exit paths of the keyboard assembly can be oriented radially away from a central portion of the recessed area. In some embodiments, a first subset of the set of particle exit paths is oriented radially relative to a central portion of the recessed area, and a second subset of the set of particle exit paths is oriented non-radially relative to the central portion of the recessed area. In certain implementations, the first subset of the set of particle exit paths is positioned at corner regions of the keycap body, and the second subset of the set of particle exit paths is positioned between the corner regions of the keycap body.

Yet another aspect of the present disclosure relates to a computing device. The computing device is comprised of a display with a planar display surface, a keyboard housing, and a set of key mechanisms disposed within the keyboard housing. The set of key mechanisms comprising a keycap body. The keycap body including a planar top surface that abuts the planar display surface when the display is positioned in a closed configuration over the keyboard housing, a recessed area extending inward from the planar top surface, and a set of channels extending from the recessed area and through at least a portion of the planar top surface.

In one or more embodiments, the set of channels is interspaced along a perimeter of the keycap body. The set of channels can also be accessible to dust particles positioned on the planar top surface. In some embodiments, the set of channels comprises one or more evacuation ends positioned beyond the planar top surface. In particular embodiments, the set of channels comprises size dimensions in a range from about 3 micron to about 30 micron.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
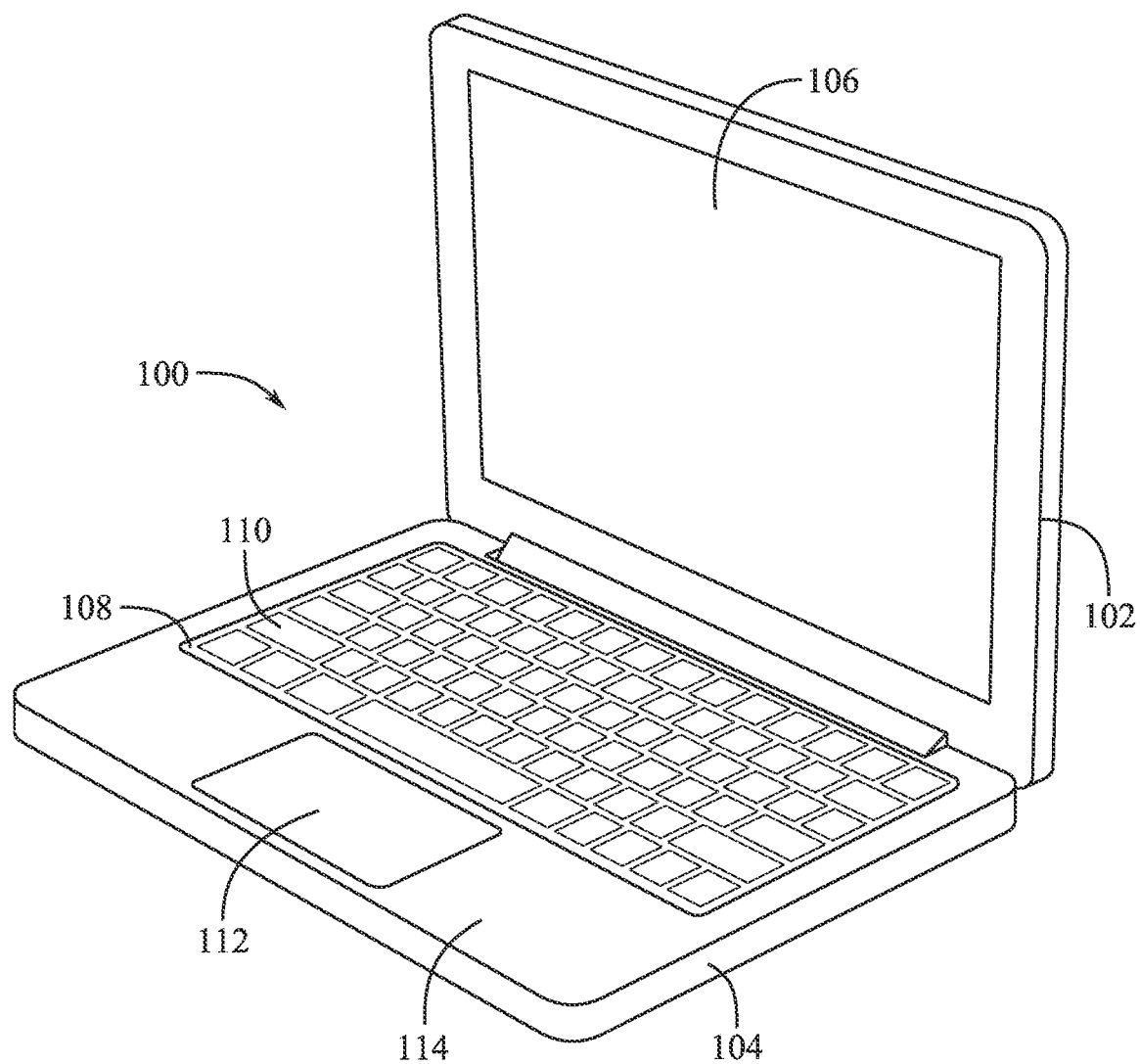
FIG. 1 illustrates a perspective view of an example portable computing device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to keycap structures for evacuating dirt particles from keycaps on keyboards for electronic devices. Various keycaps of the present disclosure include a recessed area designed to interface with the user's finger in an ergonomic fashion. The recessed area does not contact the display portion of a computing device, therefore reducing degradation of the display from oil, dirt, and grime on the keycap.

Keycaps of the present disclosure can also include a polished, raised surface that minimizes the contact surface of the keycap with the display of a computing device. The polished surface is also resistant to oil and dirt buildup.

Keycaps of the present disclosure can also include grooves that extend from the outer edge of the keycap, through the raised smooth portion, and to the recessed portion. The grooves are designed to catch dust and dirt particles and then efficiently evacuate these particles away from the smooth raised portion configured to contact the display. These grooves allow oil and dirt to be swept from the contact and recessed areas of the keycap. In addition, the grooves can reduce the amount of oil and dirt on the surface of the keycap and therefore reduce the amount of oil and dirt that interfaces with the display, thereby minimizing force concentrations, smudges, or scratches on the display caused by contaminants on the keycaps.

In some embodiments, the grooves are placed perpendicular to each side of the keycap. In another embodiment, the grooves are placed perpendicular to the sides of the keycap and radially around the corners. In another embodiment, the grooves are placed radially around the entire perimeter of the keycap. For instance, the grooves can all have major horizontal axes/elongated dimension axes that intersect at a single point or axis on the keycap (e.g., the center point or vertical axis through the center point). In some cases, a first subset of the grooves can have axes intersecting at a single point or axis and a second subset of the grooves can have axes that are parallel or that intersect at a second, different point or axis. Myriad different groove configurations fall within the scope of the present disclosure.

These and other embodiments are discussed below with reference to FIGS. 1-5. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates an example embodiment of a computing device 100 having a display housing 102 attached to a keyboard housing 104. The display housing 102 can include a display 106 that renders visualizations. The display 106 includes a planar surface (e.g., that can abut or be positioned proximate to) the keyboard housing 104 in a closed clamshell configuration. In various embodiments, the planar surface can be referred to as a cover glass, cover panel, display face, keyboard-facing surface, or keycap-contact surface of the display 106. Additionally, the keyboard housing 104 can include a keyboard 110 and a trackpad 112 that are accessible through (or at) a top surface 114 of the keyboard housing 104. The keyboard housing 104 can also include a key web 108 which defines a portion of the top surface 114 between and/or around individual keys (or key mechanisms) of the keyboard 110. The key web 108 can also include openings through which keys of the keyboard 110 can extend to be accessible by a user.

The computing device 100 is shown in FIG. 1 as being a laptop computer, but the computing device 100 can include a variety of different types of computing devices, such as notebook computers, desktop computers, tablet computers, smart phones, servers, similar devices, and combinations thereof. Furthermore, the keyboard housing 104 can be a peripheral input device that is connectable to a computing device (e.g., via a wired or wireless connection) such as a standalone keyboard, a number input pad (e.g., "tenkey" pad), a trackpad, mouse, or other pointer input device, a graphic pen tablet, similar devices, and combinations thereof. Thus, the computing device 100 is shown merely as an example device with which aspects of the present disclosure are illustrated for convenience in providing an explanation and should not be viewed as limiting to a laptop computer. For example, in a tablet computer embodiment, the computing device 100 can have a tablet computer with a display similar to display 106 that is covered by a peripheral keyboard device having keys similar to keyboard 110. The peripheral keyboard device can be positioned on a removable cover or case for the tablet computer that can be arranged (e.g., folded into a closed configuration) with the keycaps facing the display of the tablet computer.

Generally, with a laptop computer-like computing device 100, a processor, memory device, electronic storage device, portable power source or power source connector, circuit boards, keyboard and trackpad controllers, and other related electronic components can be stored in the keyboard housing 104 and/or the display housing 102. Thus, the computing device 100 can include all electrical devices and components necessary for operation of a keyboard 110 including keyboard switches and displays connected to one or more of the keys of the keyboard 110.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figure 2:
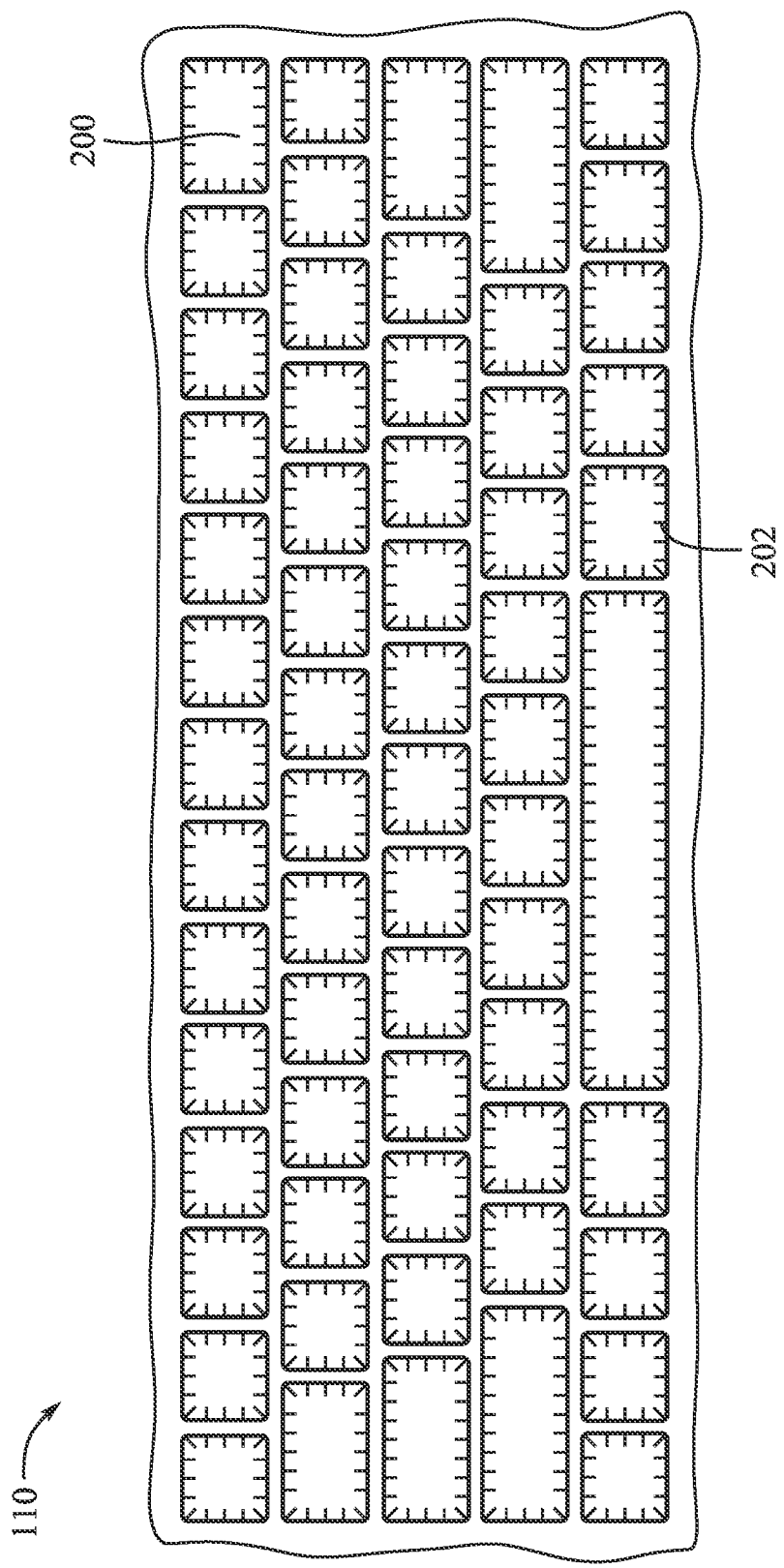
FIG. 2 illustrates a top view of an example keyboard positioned in a top surface of a keyboard housing.

FIG. 2 illustrates a top view of the keyboard 110 discussed above. As shown, the keyboard 110 includes a set of key mechanisms with keycaps 200. The keycaps 200 can comprise a variety of different materials. In some embodiments, the keycaps 200 include a plastic material. Additionally or alternatively, the keycaps 200 include a metal material. Additionally or alternatively, the keycaps 200 include a glass material. It will be appreciated that the keycaps 200 can, in certain implementations, include a combination of materials (e.g., two or more of the foregoing materials). Similarly, the keycaps 200 can include one or more surface coatings and/or finish applications (e.g., polishing). Additionally, keycaps 200 can include or can be covered by a piece of (e.g., a sheet of) flexible material. The flexible material can be applied to or overlaid on a rigid keycap or across multiple adjacent keycaps. In some embodiments, the flexible material can have embossed or raised portions that form keycap-like shapes overlaying the rigid keycaps and with gaps or cracks between the keycap-like shapes.

The keycaps 200 can further include a set of particle exit paths 202 positioned on the top surface of the keycaps 200 (e.g., along a top perimeter). The set of particle exit paths 202 can be positioned on each of the keycaps 200. In other embodiments, the set of particle exit paths 202 is positioned only on a subset of the keycaps 200. In embodiments with a cover layer of flexible material, the particle exit paths 202 can be defined on top surfaces of keycap-like shapes overlaying rigid keycap structures. Thus, properties and features of the particle exit paths 202 discussed in connection with rigid keycaps herein can be implemented around edges of portions of a cover layer of flexible material.

The set of particle exit paths 202 include grooves designed to carry oil, dirt, and dust away from particular portions of the keycaps 200. For example, the set of particle exit paths 202 can catch and evacuate particles that move into them from a top surface of the keycaps 200—especially a surface of the keycaps 200 that can engage (e.g., can abut or be positioned proximate to) a display surface.

The set of particle exit paths 202 can further include a size, spacing, and positional configuration that facilitates particle evacuation away from potentially display-contacting surfaces of the keycaps 200. For instance, the set of particle exit paths 202 can include one or more dimensions (e.g., width and depth dimensions) that range between about 3 microns and about 30 microns. In some cases, this is sufficient to capture a majority of dust particles. Additionally, in FIG. 2, the set of particle exit paths 202 are visible for illustration purposes. However, it will be appreciated that the set of particle exit paths 202 can be made with size dimensions and/or keycap positioning that make them invisible to the unaided human eye. As used herein, an "unaided human eye" is a naked eye of an average human observer having regular vision and that is not augmented or supplemented by lenses, microscopes, cameras, or other scopes or equipment used to discern keycap structure beyond the natural human eye. In some embodiments, the unaided human eye is the naked eye of a human observer with normal vision at a predetermined distance, such as at a distance of at least 12 inches from the keycaps 200, wherein the lines of the individual exit paths 202 are substantially indistinguishable from a smooth or non-lined texture on the keycaps 200.

Additional detail regarding the set of particle exit paths 202 (also referred to as a set of grooves or channels) is provided elsewhere herein.

Any of the features, components, and/or parts, including the arrangements and configurations thereof shown in FIG. 2, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2.

Figure 3A:
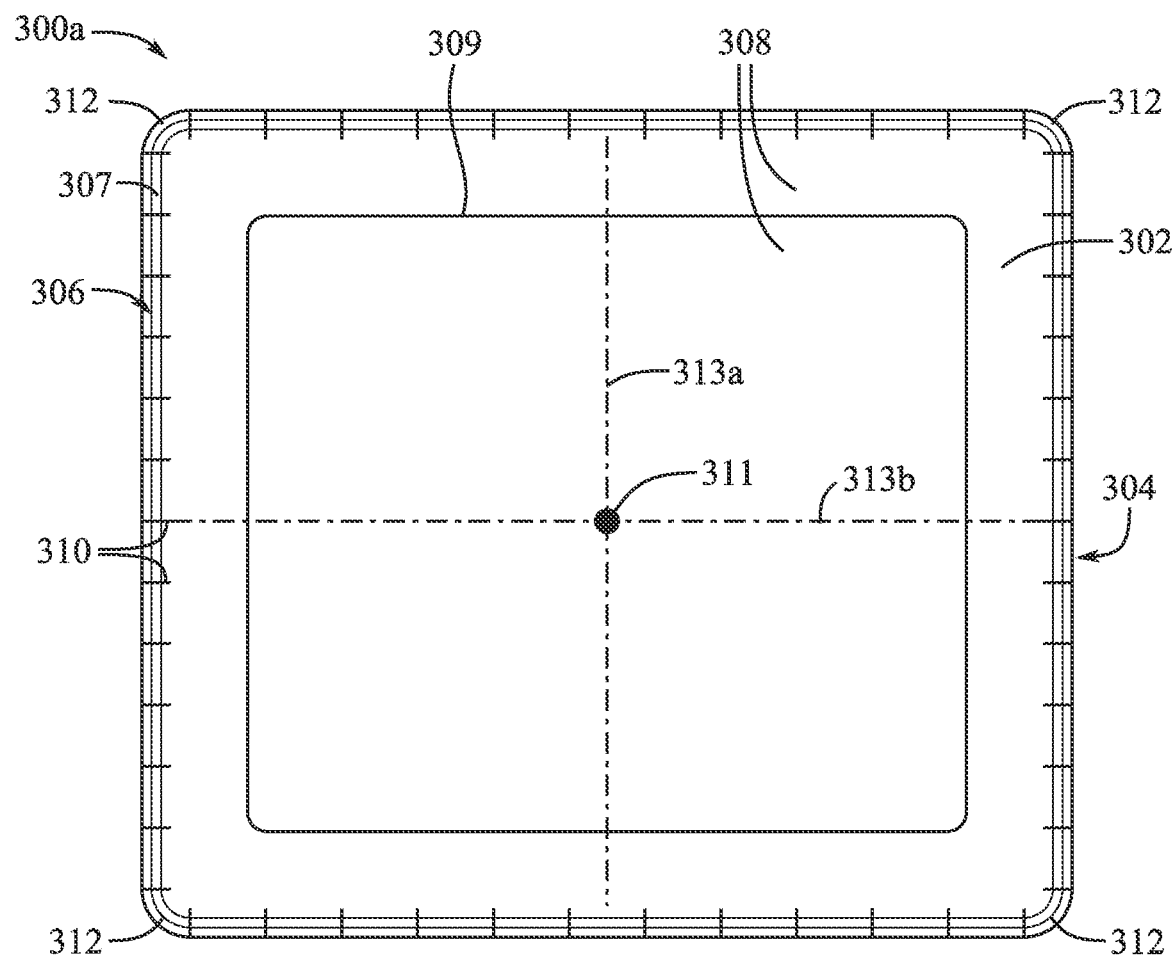
FIGS. 3A-3C respectively illustrate top views of an example keycap.
Figure 3B:
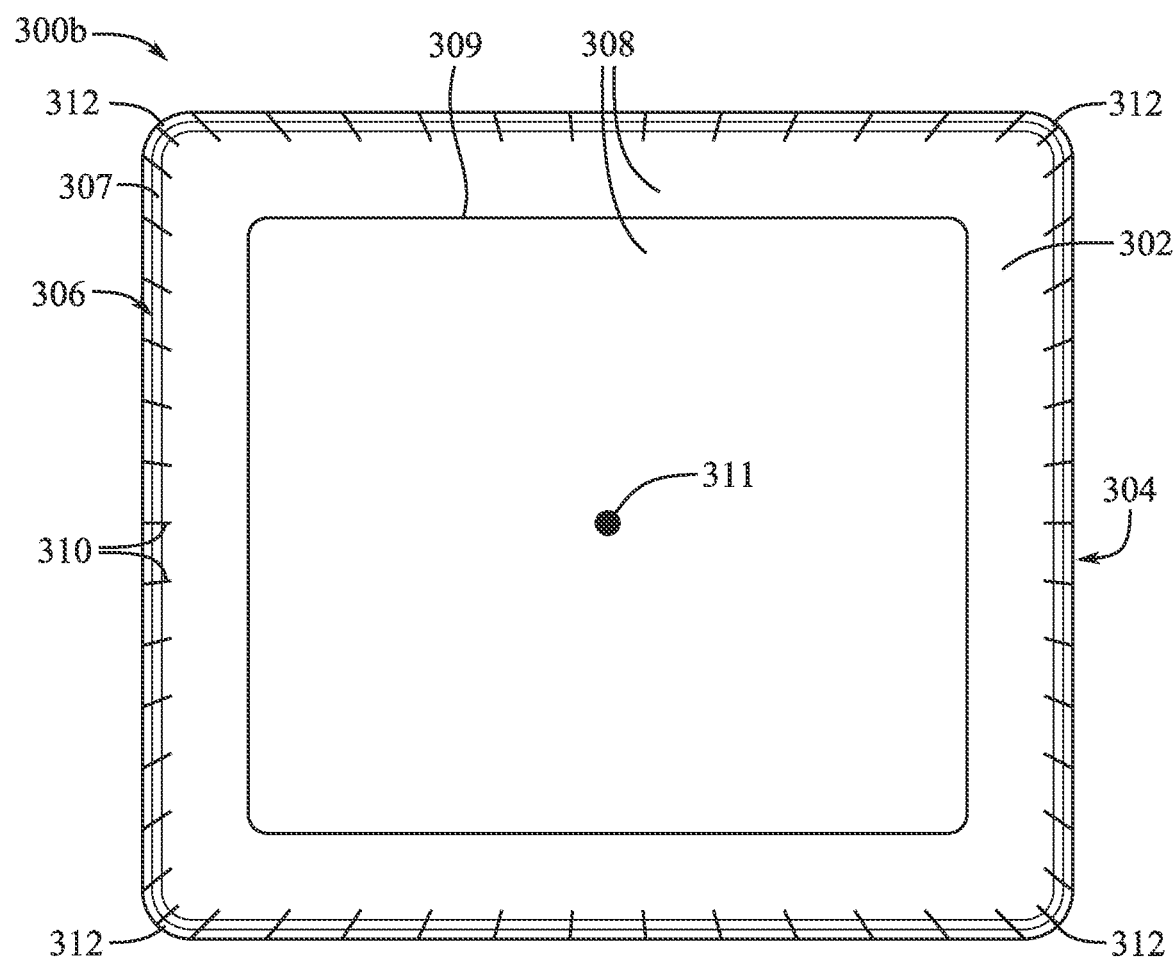
Figure 3C:
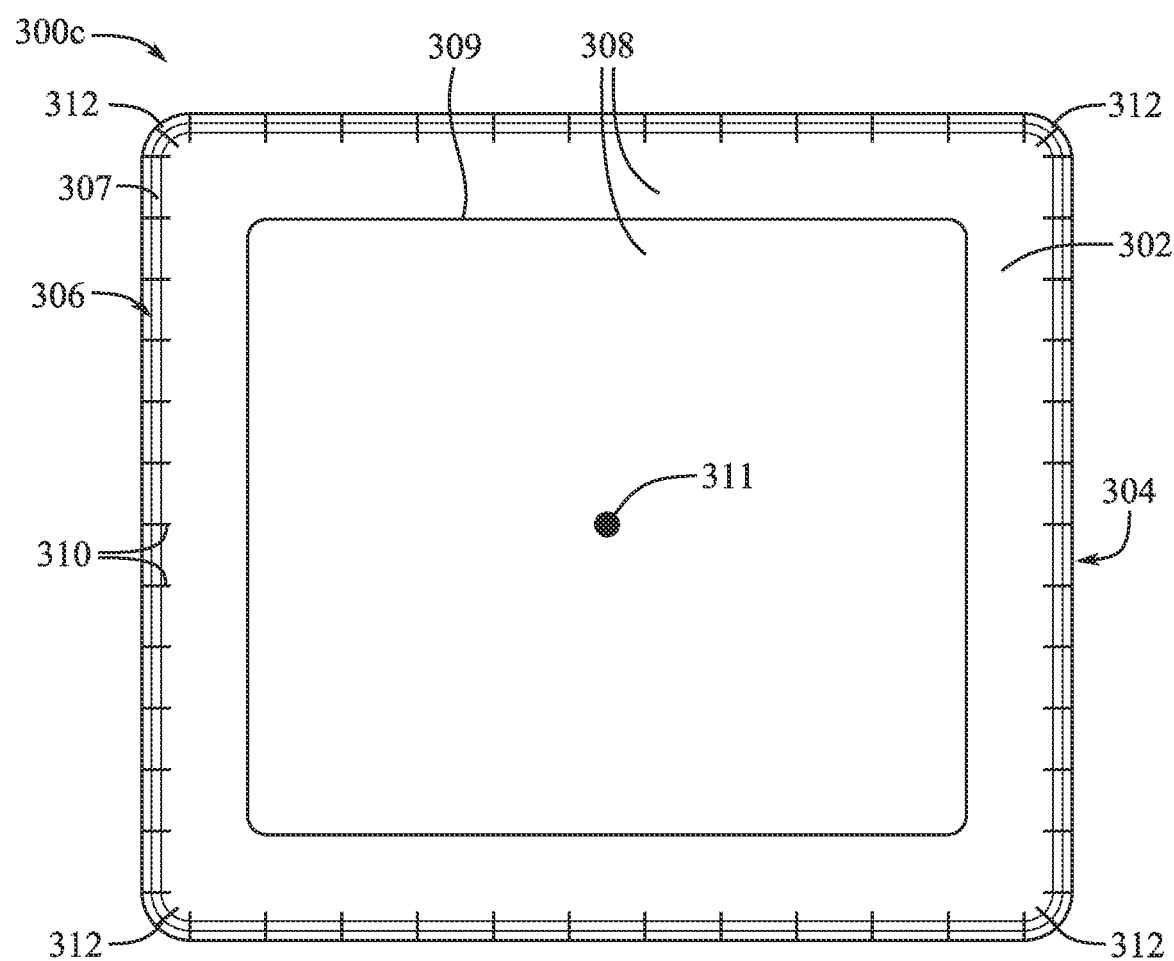

FIGS. 3A-3C illustrate top views of example keycaps 300a-300c in accordance with one or more embodiments of the present disclosure. As shown in FIGS. 3A-3C, the keycaps 300a-300c can include a keycap body with a top surface 302 and a sidewall 304. The keycaps 300a-300c can also include a top periphery region 306 extending around the top surface 302. In addition, the keycaps 300a-300c include a recessed area 308 extending across the top surface 302 inward of the top periphery region 306. That is, the top periphery region 306 is elevated relative to the recessed area 308. See also FIGS. 4-7.

In particular implementations, the top periphery region 306 includes a plateau surface 307 (discussed in more detail below in relation to FIGS. 4-7). The plateau surface 307 is a proud surface (relative to the recessed area 308). The plateau surface 307 can extend upward relative to the recessed area 308, and can be elevated relative to the recessed area 308. The keycap can have increased overall height/thickness at the plateau surface 307 as compared to the overall height/thickness at the recessed area 308. In addition, the plateau surface 307 includes a polished, planar surface intended for contacting a display surface. From the plateau surface 307, the recessed area 308 can slope downward towards the middle of the top surface 302. The downslope curvature of the recessed area 308 then levels out at a central portion 309 of the recessed area 308. Thus, the central portion 309 of the recessed area 308 can be flat and planar, and an outer portion of the recessed area 308 surrounding the central portion 309 can have an upward sloping curvature that transitions to the top periphery region 306. See FIG. 6.

The concave nature of the recessed area 308 relative to the plateau surface 307 of the top periphery region 306 is configured in this manner such that the recessed area 308 does not come into contact with a display (e.g., the display 106 of FIG. 1) when the display contacts the keycap. The recessed area 308 can therefore reduce the amount of load bearing area when the keycaps 300a-300c are pressed against the display. Additionally, by being spaced out of contact with the display, the recessed area 308 does not deposit oil, dirt, or dust thereon. Additionally, in certain implementations, the recessed area 308 can provide a tactile response and tactile 'guiding function, wherein a user's fingers are comfortably and naturally positioned in the middle of the keycaps 300a-300c while typing.

The keycaps 300a-300c can also include a set of grooves 310. The set of grooves 310 define one or more exit paths for trapped particles (e.g., dust, dirt, oil) on the top surface 302 to move away from the plateau surface and therefore out of potential contact with the display screen. The set of grooves 310 in particular can receive particles that are moved from the plateau surface 307 (e.g., via keycap movement, finger motion/brushing, etc.). In this manner, the set of grooves 310 can help reduce the amount of particles capable of interfacing with a display (i.e., by removing particles from the plateau surface 307).

To do so, the set of grooves 310 extend from the recessed area 308 and across at least a portion of the top periphery region 306. In particular implementations, the set of grooves 310 extend from the recessed area 308, across and below the plateau surface 307, and outward toward the sidewall 304. Thus, in some embodiments, the set of grooves 310 can evacuate particles outward from the center of the top surface 302 and over the keycap sidewall 304 or other outer perimeter edge. In certain implementations, intermittent or random motion of the keyboard or display, air venting across the top surface 302, hand/finger swiping on the top surface 302, vibrations from typing, electrostatic charge differential relative to the keycaps, similar physical mechanisms, and combinations thereof can aid particle evacuation via the set of grooves 310.

The set of grooves 310 can include a variety of different dimensions. In some embodiments, each groove of the set of grooves 310 is sized greater than a threshold percentile of dust particles (e.g., greater than the 90th percentile of dust particles used under the standard of Arizona test dust or the National Institute of Standards and Technology for "Ultra Fine Test Dust"). The set of grooves 310 can also be configured such that each groove of the set of grooves 310 is sized to fit a minimum threshold number of dust particles or other miniscule debris arranged in a side-by-side configuration or a stacked configuration (e.g., 5 dust particles in either direction) to help avoid trapping particles inside the set of grooves 310 rather than evacuating the particles. For instance, the set of grooves 310 can include width and depth dimensions ranging between about 3 microns and about 90 microns. Additional sizing details of the set of grooves 310 is discussed more below in relation to subsequent figures.

The set of grooves 310 can be arranged extending across the top periphery region 306 in a variety of different ways. In particular, FIG. 3A illustrates the keycap 300a with the set of grooves 310 extending across the top periphery region 306 and oriented perpendicular to the sidewall 304. Additionally shown in FIG. 3A, the set of grooves 310 need not extend around an entire perimeter of the keycap 300a. Indeed, in certain embodiments, the set of grooves 310 is not positioned along corners 312 of the top surface 302.

FIG. 3B illustrates the keycap 300b with the set of grooves 310 configured to extend across the top periphery region 306 and oriented radially relative to the central portion 309 of the recessed area 308.

It will be appreciated that the set of grooves 310 of the keycap 300b can be positioned in a variety of "radial" orientations. For example, the set of grooves 310 can be oriented radially relative to a single center point 311 or vertical axis (e.g., at a middle coordinate location of the keycap 300b where the axes of all of the grooves 310 converge) within the central portion 309. As another example, the set of grooves 310 can be oriented radially relative to a horizontal axis (or multiple horizontal axes, such as horizontal axes 313a, 313b) positioned across the top surface 302. To illustrate, the set of grooves 310 on each side of the horizontal axis 313a are parallel to each other, such as how the set of grooves 310 on the left side of the keycap 300a in FIG. 3A are parallel to the corresponding grooves on the right side of the keycap 300a. The horizontal axis 313a in that case extends from the top side of the keycap 300a in FIG. 3A to the bottom side of the keycap 300a through the center point 311 of the recessed area 308. Similarly, the set of grooves 310 shown at the top and bottom of keycap 300a extend away from axis 313b in FIG. 3A.

The set of grooves 310 can also include multiple different orientations. In accordance with one or more such examples, FIG. 3C illustrates the keycap 300c with a first subset of the set of grooves 310 oriented perpendicular to the sidewall 304 and a second subset of the set of grooves 310 oriented radially relative to the central portion 309. As shown, the first subset of the set of grooves 310 are positioned between the corners 312 of the keycap 300c, and the second subset of the set of grooves 310 are positioned at the corners 312.

Any of the features, components, and/or parts, including the arrangements and configurations thereof shown in FIGS. 3A-3C can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 3A-3C.

Figure 4:
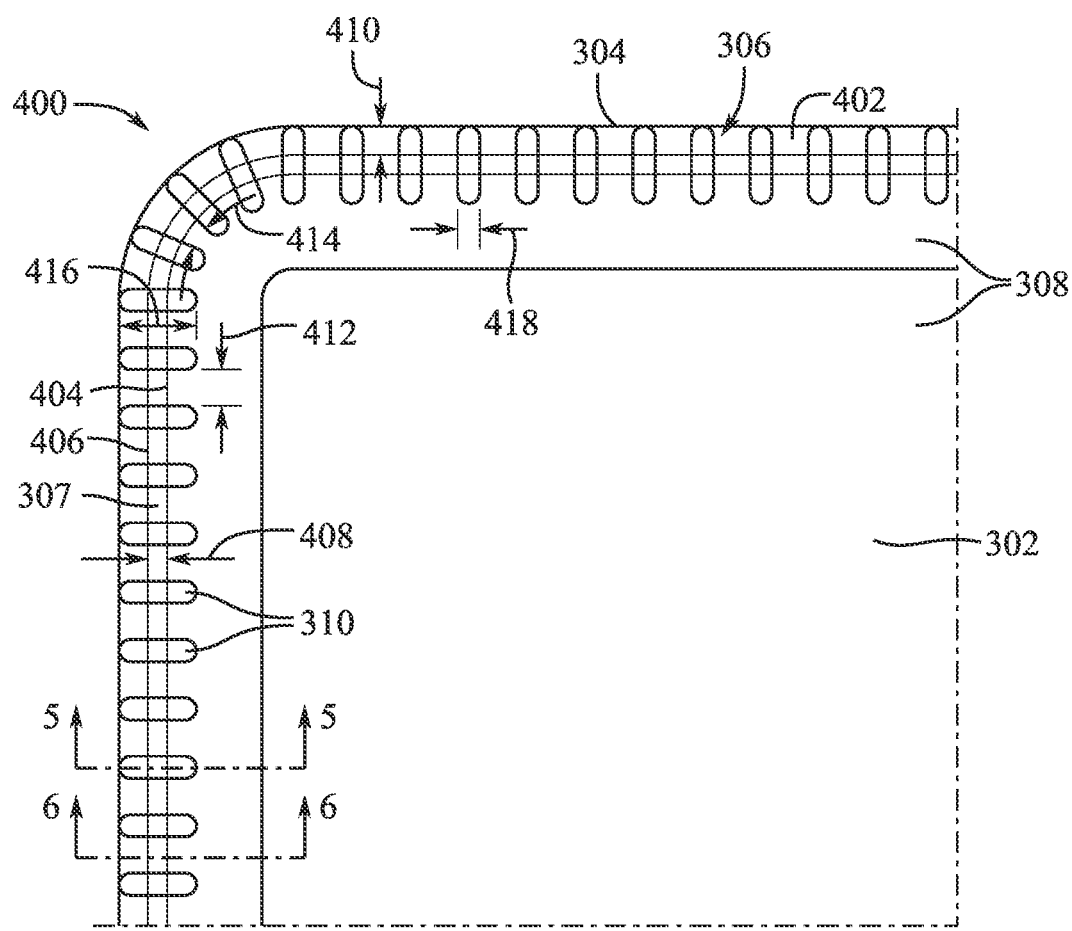
FIG. 4 illustrates a top view of portion of an example keycap with example grooves and an example plateau surface.

FIG. 4 illustrates a top view of a portion of a keycap 400. The keycap 400 has features in common with the keycap 300c and which have common numeric indicators. As shown, the keycap 400 includes the top surface 302, the sidewall 304, the top periphery region 306, the plateau surface 307, the recessed area 308, and the set of grooves 310 (as discussed above). The keycap 400 also shows additional aspects of a keycap according to one or more examples of the present disclosure.

Keycap 400 shows the plateau surface 307 including an inner edge 404 that borders the recessed area 308. In addition, the plateau surface 307 includes an outer edge 406 that borders a transition portion 402. The transition portion 402 can include a curved or rounded transition surface joining the sidewall 304 and the outer edge 406 of the plateau surface 307. See FIG. 5.

In certain implementations, the plateau surface 307 includes a plateau surface width 408 defined by the distance between the inner edge 404 and the outer edge 406. The plateau surface width 408 can be implemented having a variety of different width values. For example, the plateau surface width 408 can be dependent on the amount of load bearing surface area needed to achieve a predetermined force or pressure threshold relative to a planar display surface in contact with the plateau surface 307. The predetermined force or pressure threshold can be a cumulative force/pressure profile across the entire plateau surface 307 of the keycap. Alternatively, the predetermined force or pressure threshold can be point- or region-specific (e.g., a portion of the plateau surface 307 between adjacent grooves of the set of grooves 310).

In some embodiments, the plateau surface width 408 can be dependent on the material of the plateau surface 307. For instance, certain material(s) of the plateau surface 307 (with corresponding material properties, e.g., hardness levels, scratch resistance, elasticity, etc.) are capable of pressing a particle against a planar display surface with sufficient force or pressure to damage (e.g., scratch) the planar display surface. Therefore, the plateau surface width 408 can be sized to minimize or eliminate pressure applied by the plateau surface 307 in excess of a force or pressure threshold limit associated with expected force loads during use, storage, transportation (e.g., in a backpack), etc.

The number and width of the grooves 310 can directly reduce the surface area of the plateau surface 307. Thus, the plateau surface width 408 can also be dependent on the number or density of the set of grooves 310 to likewise achieve a predetermined force or pressure threshold relative to a planar display surface in contact with the plateau surface 307. Therefore, in some embodiments, the plateau surface width 408 can be wider to maintain a certain pressure profile along the plateau surface 307 (notwithstanding a greater density of the set of grooves 310). By contrast, the plateau surface width 408 can be narrower to maintain a certain pressure profile along the plateau surface 307 given a lower density of the set of grooves 310.

In addition, the plateau surface 307 can be positioned in myriad different ways. In some embodiments, the plateau surface 307 is positioned at an offset distance 410 from the sidewall 304. The offset distance 410 can be configured to center the plateau surface 307 relative to a groove length 416 (as also discussed below). Alternatively, the offset distance 410 can include a distance that positions the plateau surface 307 off-center of the groove length 416 (e.g., closer to or farther away from the sidewall 304 relative to a centerline going perpendicularly through the groove lengths). As shown, the offset distance 410 is constant in keycap 400. However, in some embodiments, the offset distance 410 can be non-constant and can vary at different areas or edges of the keycap. For example, the offset distance 410 can vary around the top periphery region 306 such that the plateau surface 307 forms a wave-like pattern, a step pattern, a zig-zag pattern, etc. Further, it will be appreciated that the offset distance 410 can be tuned or optimized as may be desired (e.g., for optimal evacuation of particles off the plateau surface 307 and/or out of the set of grooves 310).

The plateau surface 307 can also include surface characteristics. For example, the plateau surface 307 can include a polished surface. The polished surface of the plateau surface 307 can have a threshold surface roughness or smoothness level. In particular embodiments, the surface roughness of the plateau surface 307 is sufficiently small such that the plateau surface 307 is devoid of pits, pockets, or other surface defects greater than a threshold size in width or depth (e.g., in various embodiments, the surface can be devoid of pockets having a threshold size (in width or depth) greater than about 0.5 micron, greater than about 1 micron, or greater than about 10 micron). In this manner, the polished finish of the plateau surface 307 can help reduce or prevent particles from being trapped on the plateau surface 307 in divots, pits, surface scratches, or other rough portions. In an example embodiment, the particles can be classified as "A1 Ultrafine" particles under ISO STANDARD 12103-1, such as a collection of particles sized between 1 micron to 20 micron. Thus, the polished surface can be sufficiently smooth and lacking pits or depressions capable of retaining "A1 Ultrafine" particles or other particles sized between 1 micron to 20 micron. The polished surface can be defined between two grooves, such as on the plateau surface 307 and having a length equal to groove spacing 412 or 414 shown in FIG. 4 (i.e., a length between the edges of the grooves adjacent to the plateau surface).

Characteristics of the plateau surface 307 (and/or the set of grooves 310) can also advantageously provide or promote accessibility to the set of grooves 310. As used herein, the terms "access," "accessible," or "accessibility" refer to the ability of a particle (e.g., a dust particle) being able to enter the set of grooves 310 from the plateau surface 307. In particular, accessibility generally refer to a particle's freedom to move along the plateau surface 307 and fall into a groove of the set of grooves 310 without engaging an obstacle (e.g., a wall or ridge that slows or prevents its travel into the grooves 310). In some embodiments, accessibility of a particle into the set of grooves 310 from the plateau surface 307 includes a quantitative amount of force needed to overcome the static friction between the particle and the plateau surface 307. Thus, a particle can be accessible to the set of grooves 310 if the amount of force to overcome the static friction between the particle and the plateau surface 307 is less than a threshold force amount (e.g., about 0.1 Dyne or 0.1 gram-force). As another example, accessibility of a particle can include a quantitative amount of work (i.e., force multiplied by particle displacement) for a particle to enter the set of grooves 310 from the plateau surface 307. Thus, a particle can be accessible to the set of grooves 310 if the amount of work to for a particle to enter the set of grooves 310 is less than a threshold amount of work (e.g., about 0.1 Newton-meters). In yet another example, accessibility of a particle into the set of grooves 310 includes a quantitative measure of surface characteristics for the plateau surface 307, such as flatness, surface roughness, etc. Thus, a particle can be accessible to the set of grooves 310 if the plateau surface 307 has a surface roughness that is less than a threshold amount of surface roughness (e.g., a surface grade of N6 or lower). It will be appreciated that various quantitative aspects of accessibility of a particle into the set of grooves 310 from the plateau surface 307 can lend to an overall (or combined) qualitative effect of observed accessibility.

Further shown in FIG. 4, the set of grooves 310 includes a variety of different characteristics and dimensions. In particular, the set of grooves 310 can include a groove spacing 412 between adjacent grooves. As similarly discussed above, the groove spacing 412 can be dependent on a predetermined force or pressure threshold between the plateau surface 307 and a planar display surface. In some embodiments, the groove spacing 412 can be the same between each groove for the set of grooves 310. Alternatively, as shown in FIG. 4, the keycap 400 can include multiple groove spacings (i.e., groove spacing 412 and groove spacing 414) that differ from each other. For instance, the keycap 400 can include the groove spacing 412 between grooves for a first subset of the set of grooves 310 (e.g., between keycap corners), and the groove spacing 414 between grooves for a second subset of the set of grooves 310 (e.g., at keycap corners). In various embodiments, groove spacings can be defined between center points of the grooves, between innermost points of the grooves, or outermost points of the grooves.

The set of grooves 310 can also include other dimensions (and for myriad purposes). To illustrate, the set of grooves 310 can include a groove length 416 and a groove width 418. The groove length 416 and the groove width 418 can be sized to receive particles. In some embodiments, the groove length 416 and the groove width 418 are sized to fit a threshold minimum number of dust particles arranged in a side-by-side configuration or a stacked configuration (e.g., 5 dust particles side-by-side across width 418) to help avoid trapping particles inside the set of grooves 310 rather than evacuating the particles. For instance, the groove length 416 can be between about 30 microns and about 10 millimeters.

Additionally, the groove width 418 is between about 3 micron and about 90 microns.

Additionally or alternatively, however, at least one of the groove spacing 412, the groove length 416, or the groove width 418 can be sized based on a desired tactile characteristics of the keycap. For example, at least one of the groove spacing 412, the groove length 416, or the groove width 418 can be sufficiently small such that the set of grooves 310 provides an unperceivable tactile response (i.e., where an average human does not feel the set of grooves 310 with a fleshy pad portion of their fingertip or, in some cases, with an edge of their fingernail). As another example, at least one of the groove spacing 412, the groove length 416, or the groove width 418 can be sufficiently large such that the set of grooves 310 provides a perceivable tactile response.

Similarly, at least one of the groove spacing 412, the groove length 416, or the groove width 418 can be sized such that the set of grooves 310 provides an aesthetic element to the keycap 400. Alternatively, at least one of the groove spacing 412, the groove length 416, or the groove width 418 can be sized such that the set of grooves 310 remain invisible to the unaided human eye.

Further, it will be appreciated that at least one of the groove spacing 412, the groove length 416, or the groove width 418 can be sized differently than presently illustrated in FIG. 4. For example, the set of grooves 310 are sized and positioned to completely pass through (i.e., subsurface or underneath) the plateau surface 307. In alternative implementations, however, the set of grooves 310 only pass through a portion of the plateau surface 307 (e.g., underneath the outer edge 406 but not the inner edge 404, or vice-versa).

FIG. 4 further illustrates the corresponding section cuts for the figure views depicted in FIGS. 5-6, which are discussed below.

Any of the features, components, and/or parts, including the arrangements and configurations thereof shown in FIG. 4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4.

Figure 5:
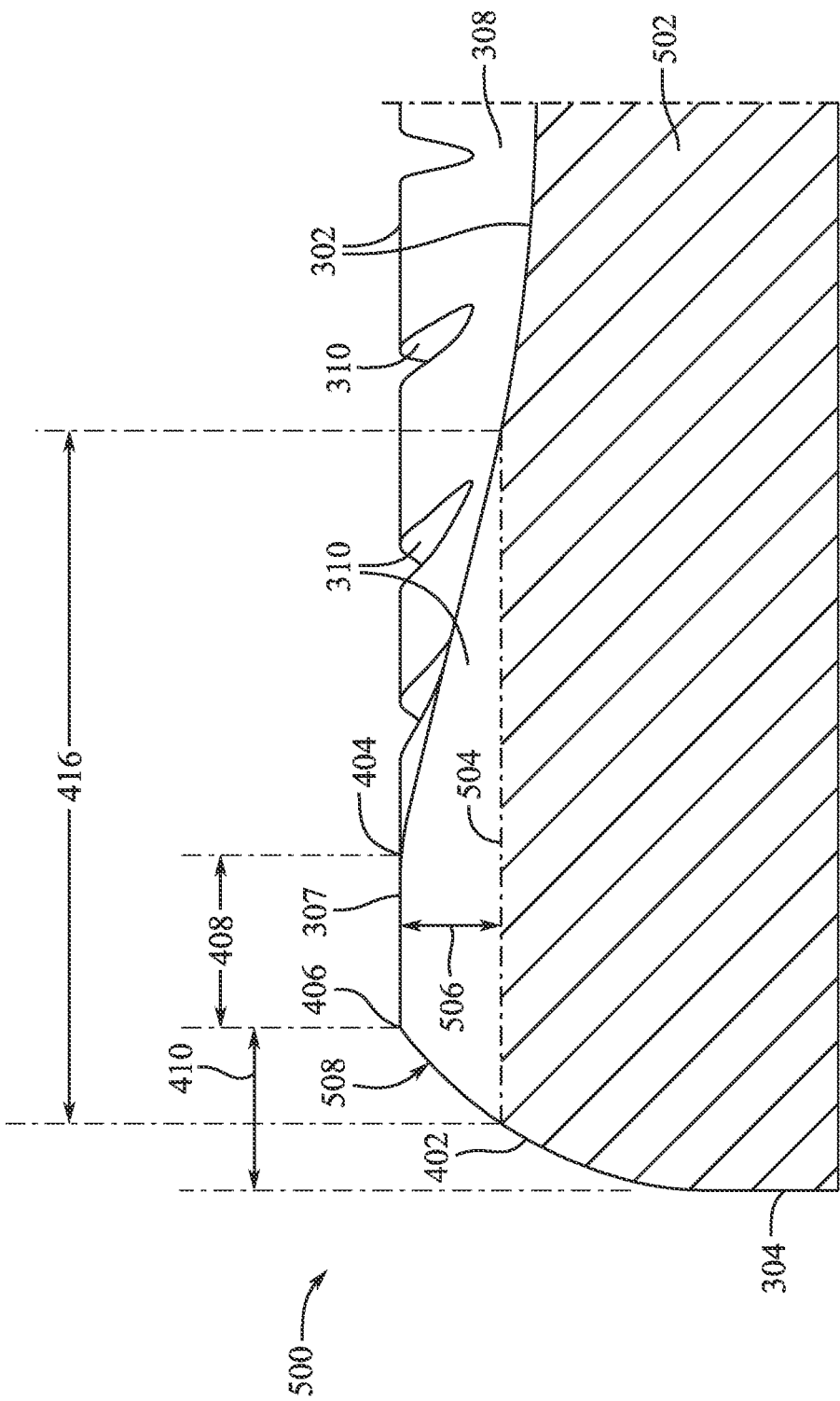
FIG. 5 illustrates a cross-section of an example keycap as taken through section lines 5-5 in FIG. 4.

FIG. 5 illustrates a section view through a groove of a keycap 500. The keycap 500 can be the same as or similar to the keycap 400 discussed above in relation to FIG. 4. As shown in FIG. 5, the keycap 500 depicts many of the dimensions and characteristics of the plateau surface 307 and the set of grooves 310 previously discussed. Specifically, FIG. 5 shows the keycap 500 including the transition portion 402, the inner edge 404, the outer edge 406, the plateau surface width 408, the offset distance 410, and the groove length 416—each discussed above in relation to FIG. 4. FIG. 5 further depicts an example depth of the set of grooves 310 and various surface curvature of the keycap 500.

In particular, each groove of the set of grooves 310 includes a groove bottom 504. The groove bottom 504 includes a groove surface below the top surface 302. In particular, the groove bottom 504 is positioned at a depth 506 measured between the top surface 302 and a keycap body 502. In certain implementations, the depth 506 to the groove bottom 504 is greatest at or near where the set of grooves 310 crosses the plateau surface 307. The depth 506 can then taper in both directions away from the plateau surface 307 (e.g., towards to the recessed area 308 and the transition portion 402).

As with other dimensions described above, the depth 506 can be sized to accommodate a threshold number of particles. To illustrate, the depth 506 can be sized to reduce or prevent multiple particles being lodged in the set of grooves 310. Thus, the depth 506 can range between about 5 microns and about 90 microns. In at least some embodiments, the depth 506 is at least 11 microns. Additionally or alternatively, the depth 506 can be sized to promote (or in some cases, prevent) tactile or visual responses, as similarly described above.

It will also be appreciated that the depth 506 need not be the same for each of the set of grooves 310 (as shown in FIG. 5). Some grooves can be deeper on certain sides of the top surface 302 of the keycap—where one or more sides are more (or less) likely to make contact with fingers (depending on the position of the keycap on a keyboard). As another example, the set of grooves 310 can include grooves with alternating depths (e.g., two deeper grooves, two shallower grooves, two deeper grooves, and so forth). Still, in other embodiments, each groove of the set of grooves 310 can have a single, equal depth 506.

The set of grooves 310 is also sized and shaped to specifically promote evacuation of particles through an evacuation end 508 of the set of grooves 310 positioned on a radially outward end the plateau surface 307. The evacuation end 508 includes a portion of a groove at which a particle can exit the recess of the groove and away from the center of the keycap. In particular, particles can be swept off the plateau surface 307, advance through the set of grooves 310, and out of the evacuation end 508 (as will be described more below in relation to FIG. 7).

The set of grooves 310 can also be oriented in various ways depth-wise that promote evacuation of particles through the evacuation end 508. Specifically, in FIG. 5, the groove bottom 504 is horizontal and parallel to the plateau surface 307. In other embodiments, however, the groove bottom 504 is angled relative to the plateau surface 307. For instance, the groove bottom 504 can be sloped towards the evacuation end 508 in a downward fashion so as to facilitate more efficient evacuation of particles through the evacuation end 508 (e.g., in response to vibration or gravity moving the particles along the groove bottom 504).

Any of the features, components, and/or parts, including the arrangements and configurations thereof shown in FIG. 5 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5.

Figure 6:
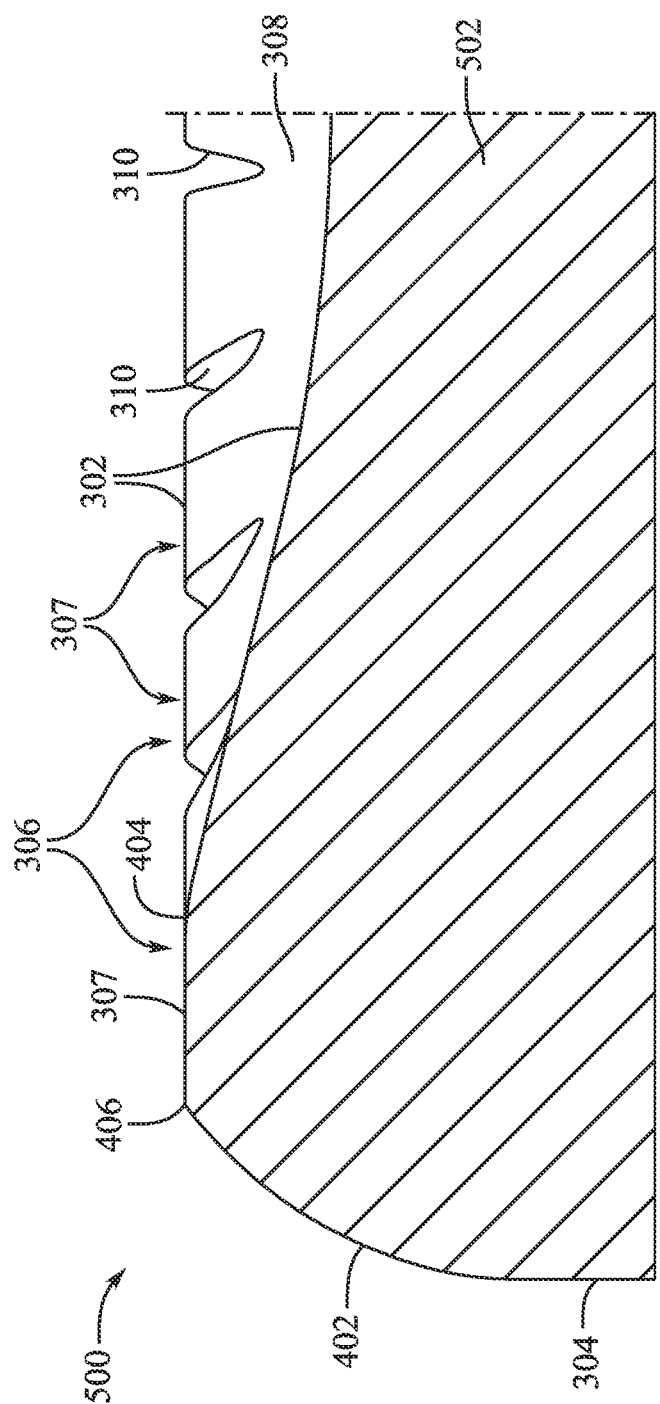
FIG. 6 illustrate a cross-section of an example keycap as taken through section lines 6-6 in FIG. 4.

FIG. 6 illustrates a section view through the keycap 500 in between adjacent grooves. As shown, the plateau surface 307 includes a planar top surface in an elevated position between the transition portion 402 and the recessed area 308. Further, the top surface 302 between adjacent grooves proceeds inward of the inner edge 404 in a downward sloped manner towards the central portion of the keycap 500, thereby forming the recessed area 308. In addition, the transition portion 402 adjoins the substantially perpendicular surfaces of the plateau surface 307 and the sidewall 304. The keycap body 502 defines these and other features of the keycap 500, including the surface contours and curvature shown in FIG. 5. FIG. 6 also shows how the keycap, at the plateau surface 307, has a greater thickness or height relative to a flat bottom surface of the keycap as compared to a central part of the keycap body 502. The plateau surface 307 protrudes upward relative to the recessed, concave center portion and forms a planar uppermost surface of the keycap adjacent to a convex outer transition portion 402. The plateau surface 307 can have sharp transitions at edges 404, 406 or, in some cases, the edges 404, 406 are smooth curves transitioning from the planar plateau surface 307 to their respective adjoining sides. The plateau surface 307 can be configured flat and planar so as to engage a flat and planar display screen surface with a predetermined amount of pressure and related contacting surface area, as opposed to creating force concentrations caused by the plateau surface 307 having a curved or pointed top ridge that could, even in the absence of contaminants, cause scratches or blemishes on a contacting display screen.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6.

Figure 7:
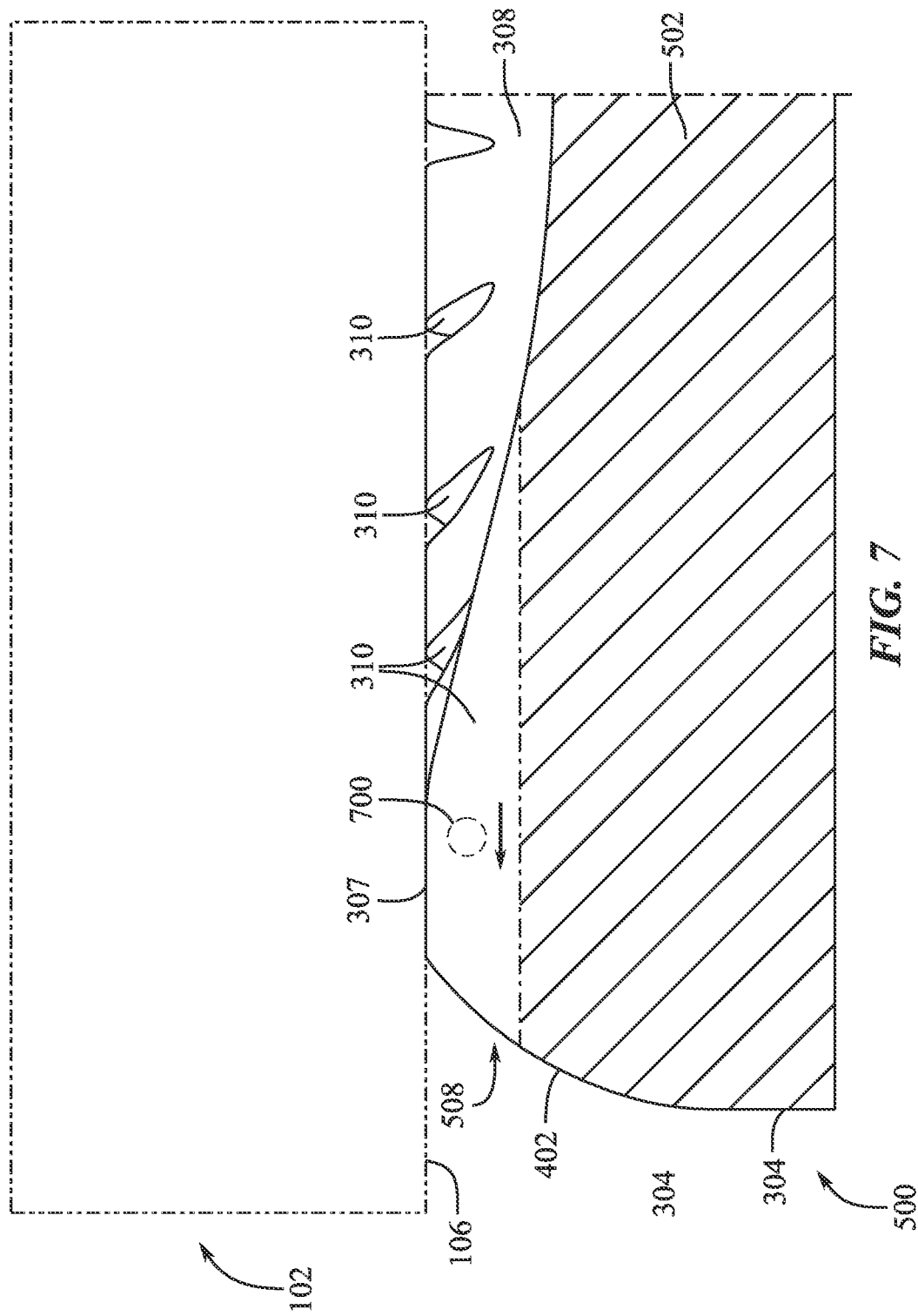
FIG. 7 illustrates a cross-section of an example keycap through an example groove and abutting display housing.

FIG. 7 illustrates the same section view in FIG. 5, but with the addition of the display housing 102. As shown in FIG. 7, the display 106 of the display housing 102 is a planar surface that can abut (or be positioned proximate to) the plateau surface 307. When the display 106 abuts the plateau surface 307, the display housing 102 is positioned in a closed configuration (i.e., where the display housing 102 is closed shut against the keyboard 110).

As opposed to being lodged between the plateau surface 307 and the display 106, a particle 700 can be swept off the plateau surface 307 and advance to the evacuation end 508 through a particular groove of the set of grooves 310 without being clamped or pinched between the display screen 106 and the plateau surface 307. In certain implementations, random motion, air venting, hand/finger swiping, vibrations from typing, electrostatic charges, similar phenomena, and combinations thereof can aid in moving particles to (and through) the set of grooves 310 and then evacuating particles out of the evacuation end 508. By removing the particle 700 from the plateau surface 307, the particle 700 does not contact the display 106. In this manner, soiling or damaging the display 106 can be avoided or reduced.

Any of the features, components, and/or parts, including the arrangements and configurations thereof shown in FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A keycap comprising:
   a keycap body including:
      a top surface;
      a top periphery region extending around the top surface;
      a recessed area extending across the top surface inward of the top periphery region, the top periphery region being elevated relative to the recessed area; and
      a set of grooves extending from the recessed area and across at least a portion of the top periphery region, each groove of the set of grooves having a groove width that provides an unperceivable tactile response to a fingertip of a user.

2. The keycap of claim 1, wherein the top periphery region comprises a plateau surface.

3. The keycap of claim 2, wherein:
   the plateau surface comprises a first edge and a second edge opposite the first edge; and
   the plateau surface is planar between the first edge and the second edge.

4. The keycap of claim 2, wherein the plateau surface comprises a polished surface devoid of pockets greater than 0.5 micron between adjacent grooves of the set of grooves.

5. The keycap of claim 2, wherein the set of grooves extends completely across the plateau surface.

6. The keycap of claim 1, wherein:
   the keycap body further comprises a side surface adjoined to the top periphery region at a keycap edge; and
   at least one groove of the set of grooves is oriented perpendicular relative to the keycap edge.

7. The keycap of claim 1, wherein:
   the keycap body further comprises a central portion of the top surface positioned within the recessed area; and
   at least one groove of the set of grooves is oriented radially relative to the central portion.

8. The keycap of claim 1, wherein the set of grooves includes a first groove with a first orientation and a second groove with a second orientation that differs from the first orientation.

9. A keyboard assembly, comprising:
   a keyboard housing;
   a set of key mechanisms disposed within the keyboard housing, each key mechanism of the set of key mechanisms comprising:
      a keycap body including:
         a sidewall;
         a plateau surface substantially perpendicular to the sidewall, the plateau surface having an inner edge and an outer edge;
         a transition portion adjoining the sidewall and the outer edge;
         a recessed area extending across a top surface of the keycap body inward of the inner edge of the plateau surface; and
         a set of particle exit paths extending from the recessed area, across the inner edge and the outer edge below the plateau surface, and to the transition portion.

10. The keyboard assembly of claim 9, wherein the plateau surface comprises a polished and planar surface configured to contact a computing device display.

11. The keyboard assembly of claim 9, wherein the set of particle exit paths is interspaced along the plateau surface, the set of particle exit paths being spatially configured to receive particles from the plateau surface.

12. The keyboard assembly of claim 11, wherein:
   each particle exit path of the set of particle exit paths comprises an evacuation end positioned at the transition portion; and
   a particle received by at least one particle exit path of the set of particle exit paths is configured to exit the evacuation end in response to movement of the keycap body.

13. The keyboard assembly of claim 9, wherein the set of particle exit paths is oriented radially relative to a central portion of the recessed area.

14. The keyboard assembly of claim 9, wherein:
   a first subset of the set of particle exit paths is oriented radially relative to a central portion of the recessed area; and a second subset of the set of particle exit paths is oriented non-radially relative to the central portion of the recessed area.

15. The keyboard assembly of claim 14, wherein:
the first subset of the set of particle exit paths is positioned at corner regions of the keycap body; and
the second subset of the set of particle exit paths is positioned between the corner regions of the keycap body.

16. A computing device, comprising:
a display with a planar display surface;
a keyboard housing;
a set of key mechanisms disposed within the keyboard housing, the set of key mechanisms comprising:
    a keycap body including:
        a top surface having an inner edge, an outer edge, and a planar surface extending between the inner edge and the outer edge, the planar surface abutting the planar display surface when the display is positioned in a closed configuration over the keyboard housing;
        a recessed area extending inward from the top surface; and
        a set of channels extending from the recessed area and through at least a portion of the top surface.

17. The computing device of claim 16, wherein the set of channels is interspaced along a perimeter of the keycap body.

18. The computing device of claim 16, wherein the set of channels is accessible to dust particles positioned on the top surface.

19. The computing device of claim 16, wherein the set of channels comprises one or more evacuation ends positioned beyond the top surface.

20. The computing device of claim 16, wherein the set of channels comprises size dimensions in a range from about 3 micron to about 30 micron.

* * * * *